(12) United States Patent
Edström

(10) Patent No.: US 6,996,454 B1
(45) Date of Patent: Feb. 7, 2006

(54) METHOD AND CONTROL SYSTEM FOR CONTROLLING A CONVEYOR SYSTEM AND A PLANT FOR BALING PAPER PULP

(75) Inventor: Tomas Edström, Ankarsvik (SE)

(73) Assignee: Valmet Fibertech AB (SE)

( * ) Notice: Subject to any disclaimer, the term of this patent is extended or adjusted under 35 U.S.C. 154(b) by 0 days.

(21) Appl. No.: 09/600,762

(22) PCT Filed: Jan. 21, 1999

(86) PCT No.: PCT/SE99/00085

§ 371 (c)(1),
(2), (4) Date: Sep. 6, 2000

(87) PCT Pub. No.: WO99/37563

PCT Pub. Date: Jul. 29, 1999

(30) Foreign Application Priority Data

Jan. 22, 1998 (SE) .............................................. 9800162

(51) Int. Cl.
*G06F 7/00* (2006.01)

(52) U.S. Cl. ...................... 700/230; 700/8; 198/781.06; 198/358; 198/575

(58) Field of Classification Search ................ 700/230, 700/8; 198/358, 575, 781.06
See application file for complete search history.

(56) References Cited

U.S. PATENT DOCUMENTS

| | | | | |
|---|---|---|---|---|
| 3,703,725 A | * | 11/1972 | Goversall et al. ............ | 198/358 |
| 4,347,563 A | * | 8/1982 | Paredes et al. .............. | 364/137 |
| 4,534,462 A | * | 8/1985 | Hoover et al. .............. | 198/781 |
| 5,086,910 A | * | 2/1992 | Terpstra ...................... | 198/572 |
| 5,092,449 A | * | 3/1992 | Bolin et al. .................. | 198/430 |
| 5,209,626 A | * | 5/1993 | Lichti, Sr. et al. .......... | 414/313 |
| 5,213,201 A | | 5/1993 | Huber et al. ................. | 198/781 |
| 5,228,558 A | * | 7/1993 | Hall ............................ | 198/784 |
| 5,285,887 A | * | 2/1994 | Hall ............................ | 198/460 |
| 5,456,347 A | * | 10/1995 | Best et al. ............. | 198/781.06 |
| 5,582,286 A | * | 12/1996 | Kalm et al. ............ | 198/781.06 |
| 5,862,907 A | * | 1/1999 | Taylor .................... | 198/781.05 |
| 5,984,498 A | * | 11/1999 | Lem et al. .................... | 364/131 |
| 6,021,888 A | * | 2/2000 | Itoh et al. .................... | 198/783 |
| 6,028,532 A | * | 2/2000 | Tsurumoto et al. .... | 340/825.53 |
| 6,076,652 A | * | 6/2000 | Head, III ................ | 198/341.07 |
| 6,240,335 B1 | * | 5/2001 | Wehrung et al. ............ | 700/213 |
| 6,253,909 B1 | * | 7/2001 | Kalm et al. ............ | 198/781.06 |
| 6,259,967 B1 | * | 7/2001 | Hartlepp et al. ............ | 700/230 |
| 6,302,266 B1 | * | 10/2001 | DeFrancisco et al. .. | 198/781.06 |
| 6,315,104 B1 | * | 11/2001 | Ebert ...................... | 198/460.1 |
| 6,415,914 B2 | * | 7/2002 | Itoh et al. .............. | 198/781.06 |
| 6,460,683 B1 | * | 10/2002 | Pfeiffer ................... | 198/460.1 |

FOREIGN PATENT DOCUMENTS

| | | |
|---|---|---|
| CH | 678715 A5 | 10/1991 |
| DE | 41 15 327 A1 | 11/1992 |
| DE | 195 46 626 A1 | 6/1997 |

* cited by examiner

*Primary Examiner*—Donald P. Walsh
*Assistant Examiner*—Michael E Butler
(74) *Attorney, Agent, or Firm*—Lerner, David, Littenberg, Krumholz & Mentlik, LLP

(57) ABSTRACT

Methods are disclosed for controlling conveyor systems including providing status information for each of a plurality of conveyors, providing control information for each of the conveyors based solely upon the status information from that conveyor and from adjacent conveyors, and controlling each of the conveyors by communicating the control information between the adjacent conveyors. A control system for controlling such a conveyor system is also disclosed including a plurality of control units each for controlling a respective one of the conveyors, and a plurality of sensors in communication with the conveyors for collection and supplying status information to each of the conveyors, each of the control units being in communication only with the corresponding conveyor and adjacent conveyors whereby control information is provided for each of the conveyors based solely upon the status information from that conveyor and adjacent conveyors and each of the conveyors is controlled by communicating the control information between the adjacent conveyors.

16 Claims, 2 Drawing Sheets

METHOD AND CONTROL SYSTEM FOR CONTROLLING A CONVEYOR SYSTEM AND A PLANT FOR BALING PAPER PULP

FIELD OF THE INVENTION

The present invention relates to a method for controlling a conveyor system, comprising a plurality of conveyors, and a control system for such a conveyor system comprising a plurality of conveyors to each of which is allocated a control unit in communication with sensing means for the supply of status data. On the basis of these status data and on the basis of status data from other conveyors, the control unit generates control signals to control the conveyor. The present invention also relates to a plant for baling paper pulp having such a conveyor system.

BACKGROUND OF THE INVENTION

The sensing means for a conveyor may consist of mechanical limit sensors or inductive transducers. The status data obtained from the sensing means of a conveyor provide combined information concerning the status of the conveyor, i.e. if the conveyor is free or if it is carrying a load (e.g. a bale), as well as the location of the conveyor. In this context "conveyor" shall also be understood to mean machines in the conveyor system other than true conveyors. From a communication point of view, all such machines must function as conveyors.

Conveyor equipment in the pulp baling line for the manufacture of board, for instance, is seldom the same from case to case. This is primarily because the premises in which the conveyor equipment is to be installed are seldom similar, but also because the form of the load (bale) and the capacity required for the conveyor system differs from plant to plant. Each plant is specifically designed, thus requiring extensive engineering work upon delivery. In a typical case approximately half the engineering work is devoted to the conveyors and half to the other machinery included in the plant.

Control systems in modern conveyor systems of the type under discussion are also constructed so that the control unit for each conveyor is arranged in a central computer common to the conveyor system. The central computer thus includes a control unit for each conveyor so that each control unit is in reality a program module. Each conveyor communicates through its control unit with all other conveyors on which the conveyor in question may be dependent. The control unit receives status data from the conveyors on which it is dependent. A conveyor is dependent on the conveyors whose status affects how the conveyor in question shall be controlled. Purely theoretically a conveyor may be dependent on an infinite number of other conveyors. In practice, however, a conveyor is usually dependent on not more than about 15 other conveyors and its control unit thus receives status data from 15 other conveyors. On the basis of the status data the control unit creates control signals to control the conveyor pertaining to the control unit.

Since each conveyor in a conveyor system has its own set of conveyors on which it is dependent, and since two conveyor systems are hardly ever alike, extremely complex, customer-unique solutions are required for each conveyor system. In principle, therefore, a unique control unit is required for each conveyor.

If for some reason the plant is to be altered, by a conveyor being removed, for instance, or being given a slightly altered function, the control unit of this conveyor and the control units of all conveyors dependent on this conveyor must then be reprogrammed.

An object of the present invention is to avoid these problems and thereby, amongst other things, to greatly reduce the engineering work, and consequently the costs involved.

SUMMARY OF THE INVENTION

This and other objects have now been realized by the discovery of a method for controlling a conveyor system including a plurality of conveyors comprising providing status information for each of the plurality of conveyors, providing control information for each of the plurality of conveyors based solely upon the status information from the conveyor and from adjacent conveyors, and controlling each of the plurality of conveyors by communicating the control information between the adjacent conveyors.

In accordance with the present invention, this and other objects have now also been realized by the invention of a control system for controlling a conveyor system including a plurality of conveyors comprising a plurality of control units each for controlling a respective one of the plurality of conveyors, and a plurality of sensing members in communication with each of the plurality of conveyors for collecting and supplying status information to each of the plurality of conveyors, each of the plurality of control units being in communication only with the corresponding conveyor and adjacent conveyors whereby control information is provided for each of the plurality of conveyors based solely upon the status information from the conveyor and from the adjacent conveyors and each of the plurality of conveyors is controlled by communicating the control information between the adjacent conveyors.

In accordance with one embodiment of the control system of the present invention, each of the plurality of control units comprises a standard unit dimensioned for communication with the control units associated with a maximum number of the adjacent conveyors.

In accordance with another embodiment of the control system of the present invention, each of the plurality of control units is disposed on the corresponding conveyor.

In accordance with another embodiment of the control system of the present invention, the control system includes a plurality of cables connecting the plurality of control units with the control units corresponding to the adjacent conveyors.

In accordance with another embodiment of the control system of the present invention, the control system includes a plurality of communication processors associated with each of the corresponding plurality of control units, and a field bus for communicating between each of the plurality of control units and the plurality of control units associated with the adjacent conveyors.

In accordance with another embodiment of the control system of the present invention, the control system includes a common central computer having a plurality of program modules, the plurality of control units for the corresponding plurality of conveyors comprising the plurality of program modules. In a preferred embodiment, the central computer includes a communication processor, and the control system includes a plurality of additional communication processors associated with each of the plurality of conveyors, and a field bus for communicating between each of the plurality of communication processors and the plurality of communication processors associated with the adjacent conveyors.

In accordance with the present invention, recurrence is exploited, i.e. each conveyor communicates only with conveyor(s) adjacent to it, which in turn communicate with their adjacent conveyors, and so on. An adjacent conveyor is deemed to be one which the conveyor can deliver a load to or receive a load from. The communication comprises the control unit of each conveyor receiving or transmitting control information from or to the control unit of each of its adjacent conveyors. The control information of each conveyor is created from the conveyor's own status data and the control information of its adjacent conveyors. Each conveyor does not therefore possess direct information concerning the status of its adjacent conveyors, but instead is in possession of control information created on the basis of status data from several conveyors. A chain of conveyors is thus searched and status data are returned in the form of control information.

Control signals are created for controlling the conveyor in question on the basis of the conveyor's own status data and the control information possessed by the conveyor's control unit.

The control units of the conveyors can thus be standardized. The scope of the control information between adjacent conveyors is always the same, regardless of the type of conveyor used. From the communication point of view turning and travelling operations are equivalent, and a stationary conveyor is treated as a travelling conveyor with only one position. Thus, only one program is required for moving the load between conveyors. All transport systems will be identical from the programming aspect and subsequent alterations of existing plants are as simple as building a new plant. When expanding or altering an existing plant it is only necessary to specify the new adjacent conveyors. From the communication aspect a stationary conveyor can easily be changed to a travelling conveyor by entering information about the new adjacent conveyors.

Great savings can be achieved with the present invention since the control units of the conveyors are built as complete, standardized units. Engineering work, such as programming prior to delivery of a new conveyor system, as well as engineering work upon installation of the conveyors will be reduced typically to about one tenth of that previously required. This saving in labor applies both when converting an existing conveyor system in accordance with the present invention, and when building new installations. Even existing plants with different types of control systems can be converted to control systems according to the present invention.

The control unit according to the present invention is dimensioned for communication with control units pertaining to a maximum number of adjacent conveyors. This means, therefore, that the control unit is dimensioned for the "worst case" which, in the case of a conveyor system for the baling line for paper pulp, consists of a travelling conveyor with five different positions, each position having two adjacent conveyors. The same standardized unit is used in the simplest case, i.e. a straight conveyor with one adjacent conveyor, but in this case its capacity is only partially used.

In the control system according to the present invention, for instance, the control unit of a conveyor may be connected directly to the control units of its adjacent conveyors, or arranged to communicate with the control units of the adjacent conveyors by way of a field bus. The laying of cable is thus minimized if a field bus is used for communication between the conveyors.

Physical inputs and outputs are arranged on each conveyor, and are used for communication with motors, lamps, signal equipment, sensing means, etc. The inputs generate status data to the control unit and the outputs transmit control signals supplied from the control unit. The input and output can also be standardized.

According to an advantageous embodiment of the control system according to the present invention each conveyor comprises a control unit, a communication processor for the field bus and physical inputs and outputs.

According to another embodiment of the control system according to the present invention the control units are realized as program modules in a central computer and the communication with the conveyors occurs by means of a communication processor in the central computer. In this case, the central computer comprises a program module for each conveyor. This program module then forms the control unit for the conveyor in question.

BRIEF DESCRIPTION OF THE DRAWINGS

To further explain the present invention, embodiments of the control system according to the present invention, selected by way of example, will now be described with reference to the accompanying drawings, in which.

DETAILED DESCRIPTION

Figure 1:
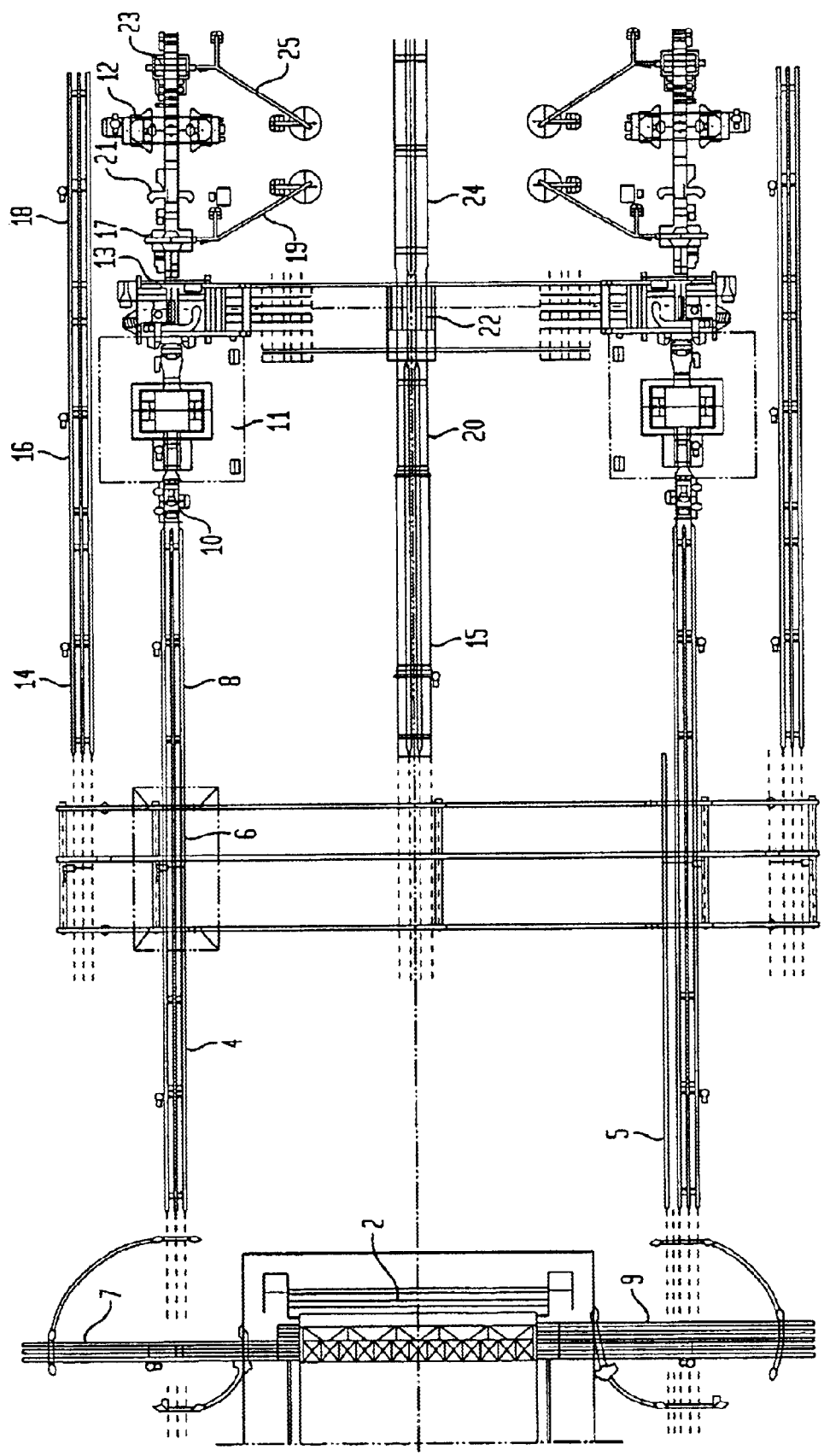
FIG. 1 is a top, elevational view of a portion of a conveyor system for baling paper pulp in accordance with the present invention.

Turning to the Figures, in which like reference numerals refer to like elements thereof, FIG. 1 shows part of a baling line for paper pulp with a cutter 2 situated at the far left of the figure, from which bales are transported sideways and swung by swivel conveyors, 7 and 9, to the conveyors 4 or 5. In the figure the swivel conveyors, 7 and 9, are shown in a waiting position for receipt of bales from the cutter 2. The bale is transported from conveyor 4 to conveyor 6 and then on to conveyors 8 and 10.

The framed part 11 after the conveyor 10 comprises a weighing machine, a bale press and then another conveyor for transporting the bale to a subsequent wrapping machine 13. The wrapping machine 13 wraps the bale in a wrapping sheet supplied by conveyors 15, 20, and 22, as will be discussed below.

The wrapping machine 13 is followed by a first binding machine 17 in which the bale is bound with wire 19. After the binding machine 17 there is located a marking machine 21 and a folding machine 12 with a turntable for lifting and turning the bale in order to fold in the corners of the wrapping sheet, after which the bale is supplied to a second binding machine 23 to complete wrapping by binding with a wire 25 passed from the other direction as compared with the wire in the first binding machine 17.

Additional conveyors are also provided for gradual transportation of the bales between the above-mentioned machines for wrapping.

These wrapping operations, the subsequent stapling operations, and further handling of the bales would be understood by those skilled in the art, and are not described in the detail.

Each conveyor is associated with a control unit comprising physical inputs and outputs, as well as sensing means. Status data from the sensing means, inter alia, are supplied to the control unit by means of the physical inputs, and control signals, inter alia, are supplied from the control unit to the conveyor by means of the outputs.

The control unit of the conveyor is arranged, in a manner described in more detail below, to communicate with the control units of the conveyors adjacent to it. Each control unit generates control information which is created on the basis of the status data of its own conveyor, and also on control information from adjacent conveyors. By means of the control units of the adjacent conveyors, thus, control information is gathered which, together with its own status data, is used to create control signals to control its own conveyor.

The conveyor 6 thus obtains control information from the conveyors 4, 8, 14 and 15, and the conveyor 8 obtains control information from the conveyor 10 as well as the conveyor 6, etc.

A sequence might have the following appearance where the starting position is a bale on conveyor 6, which bale is to be transported further. If the control unit for conveyor 6 receives control information from the control unit for conveyor 8 that the latter is unable to receive the bale, the bale will be carried on conveyor 6 to conveyor 14, if the control information of its control unit indicates that there is room for it to be temporarily stored on conveyor 14, 16 or 18. If we assume that conveyors 14 and 16 are occupied, but conveyor 18 is free, the status data of conveyor 14 will then indicate that it is occupied. The control unit for conveyor 14 asks the control unit for conveyor 16 if there is room. The status data of conveyor 16 indicate that it is occupied. The control unit for conveyor 16 asks the control unit for conveyor 18 if there is room. The status data of conveyor 18 indicate that it is free. The control unit for conveyor 18 then responds with control information to the control unit for conveyor 16 that it is free. The control unit for conveyor 16 responds with control information to the control unit for conveyor 14 that there is room. The control unit for conveyor 14 responds with control information to the control unit for conveyor 6 that there is room. As soon as there is room on conveyors 8 and 10 to transport bales to subsequent wrapping and further handling, and conveyor 4 and the swivel conveyor 7 are empty of bales, bales are returned from temporary storage on conveyors 14, 16, and 18 to conveyor 6, and so on. The baling line normally operates more quickly than the cutter and temporary storage is therefore only required in the event of disturbances in the operation of the baling line.

The arrangement shown in FIG. 1 has duplicate baling lines, with a lower line in the figure that is identical to the line described in the upper part of the figure.

Wrapping material is supplied between these lines by the conveyors 15, 20, 22 and 24. The supply of wrapping material is common to both baling lines.

Figure 2:
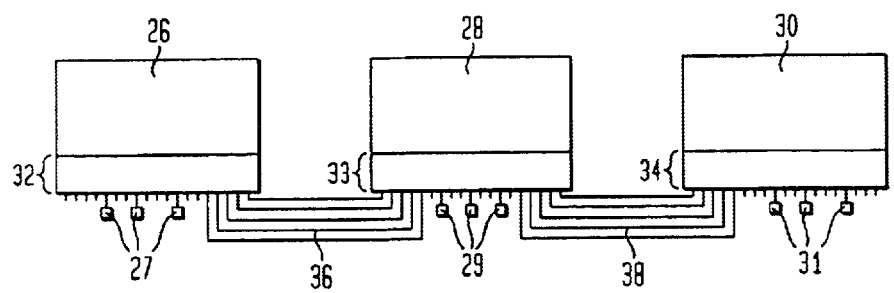
FIG. 2 is a schematic representation of one embodiment of a control system for the conveyor system shown in FIG. 1.

FIG. 2 shows an embodiment of the control system according to the present invention having a number of control units, 26, 28, and 30, each of which is arranged on a conveyor. Each control unit, 26, 28, and 30, is directly connected to the control unit of adjacent conveyors by means of physical inputs and outputs, 32, 33, and 34, and cables, 36 and 38.

Sensing means, 27, 29, and 31, are connected to the inputs to sense the status of the conveyor and supply status data to the relevant control unit, 26, 28, and 30.

Figure 3:
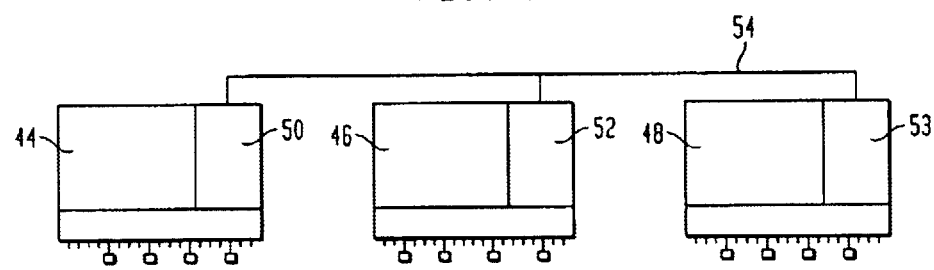
FIG. 3 is a schematic representation of another embodiment of a control system for the conveyor system shown in FIG. 1.

FIG. 3 shows an embodiment in which each of the control units, 44, 46, and 48, is arranged on a conveyor and all communicate with each other by means of a communication processor, 50, 52, and 53, arranged on each conveyor, by way of a field bus 54.

Figure 4:
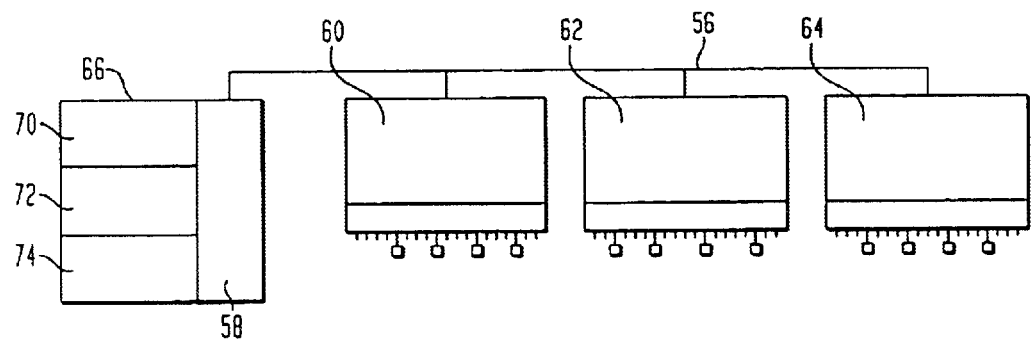
FIG. 4 is a schematic representation of another embodiment of a control system for the conveyor system shown in FIG. 1.

FIG. 4 shows another alternative embodiment in which control units, 70, 72, and 74, are arranged in a central computer 66 and where each conveyor is allocated its own control unit, 70, 72, and 74. The status data of each conveyor are transmitted with the aid of a communication processor, 60, 62, and 64, by means of a field bus 56, and through a communication process 58 in the central computer 66 to respective control units, 70, 72, and 74. Control signals are transmitted from the central computer 66 by the communication processor 58, by way of the field bus 56 and by means of the communication processors, 60, 62, and 64, to the conveyors. In this embodiment control information is transmitted directly between the control units, 70, 72, and 74, in the central computer 66. In this embodiment, recurrence is also implemented in the central computer 66, i.e. the control unit of each conveyor communicates only with the control units of its adjacent conveyors.

The embodiments exemplified in FIGS. 3 and 4 also comprise inputs, outputs, and sensing means as described with reference to FIG. 2.

In the control system according to the present invention the control information is transmitted between the control units cyclically. The control units are therefore constantly in possession of all requisite information and the above sequences describing how information is transmitted thus occur instantaneously.

Conveyor systems for baling lines of the type described above normally comprise the following types of conveyors: stationary; swivel; travelling; stationary with turntable; tiltable; angular overloader, stationary; angular overloader, travelling.

Examples of signals that are transmitted for control of the conveyor system are: bale on conveyor, conveyor position 1, conveyor position 2, conveyor position 3. etc., bale position 1, bale position 2, bale position 3, etc., ready to receive bale forward position 1, ready to receive bale forward position 2, ready to receive bale forward position 3. etc., ready to receive bale back position 1, ready to receive bale back position 2, ready to receive bale back position 3, etc., supply bale forwards position 1, supply bale forwards position 2, supply bale forwards position 3, etc., supply bale backwards position 1, supply bale backwards position 2, supply bale backwards position 3, etc., and conveyor forward, conveyor back, chain forward, chain back, etc.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A control system for controlling a conveyor system that includes a plurality of conveyors, said control system comprising:

a plurality of sensing units each associated with a specific one of the plurality of conveyors and being operable to collect status information concerning its associated conveyor; and a plurality of control units each associated with a respective one of the plurality of conveyors and being operable to receive status information concerning its respective conveyor from said sensing unit associated with the respective conveyor and to receive control information generated by at least a further one of said plurality of control units, said further control unit being associated with a further one of the plurality of conveyors that is adjacent to the respective conveyor, the control information being based on further status information concerning the further conveyor and further control information received by said further control unit that is generated by a still further one of said plurality of control units, the still further control unit being associated with a still further one of the plurality of conveyors that is adjacent to the further conveyor, the control information thereby being based on at least some of still further status information concerning the still further conveyor, said each control unit being further operable to control its respective conveyor based on the status information concerning the respective conveyor and the received control information.

2. The control system of claim 1 wherein each of said plurality of control units is co-located with its associated conveyor.

3. The control system of claim 1 including a plurality of cables each connecting a respective pair of said plurality of control units that are associated with adjacent ones of the plurality of conveyors.

4. The control system of claim 1 including a plurality of communication processors each associated with and coupled to a specific one of said plurality of control units, and a field bus connecting each of said plurality of communication processors.

5. The control system of claim 1 including a plurality of communication processors each associated with and coupled to a specific one of said plurality of conveyors; a central computer including a further communication processor, each of said plurality of control units being co-located with said central processor and being coupled to said further communication processor; and a field bus connecting each of said plurality of communication processors and said further communication processor.

6. The control system of claim 1 wherein said each control unit is further operable to generate associated control information that is based on the status information concerning its respective conveyor and the received control information.

7. The control system of claim 1 wherein the respective conveyor, the further conveyor and the still further conveyer are part of a chain of conveyors; the control information being further based on at least some of the status information concerning additional ones of the chain of conveyors.

8. The control system of claim 7 wherein the control information is based on at least some of the status information concerning each of the chain of conveyors.

9. The control system of claim 1 wherein at least one of said plurality of control units receives respective control information generated by each of a plurality of further control units that are respectively associated with further ones of the plurality of conveyors, the further conveyors each being adjacent to the conveyor associated with said at least one control unit, the control information generated by a particular one of the further control units being based on particular further status information concerning its associated further conveyor and particular further control information received by said particular further control unit that is generated by a particular still further one of said plurality of control units, the particular still further control unit being associated with a particular still further one of the plurality of conveyors that is adjacent to the particular further conveyor, the control information received from the particular control unit thereby being based on at least some of particular still further status information concerning the particular still further conveyor; and said control unit is operable to control its associated conveyor based on the status information concerning the associated conveyor and the respective control information received from each of said further control units.

10. The control system of claim 9 wherein said control unit is further operable to generate associated control information that is based on the status information concerning the associated conveyor and the respective control information received from each of said further control units.

11. A method of controlling a conveyor system that includes a plurality of conveyors, said method comprising:
collecting respective status information concerning each of a plurality of conveyors; and
for each one of the plurality of conveyors:
receiving the respective status information concerning that conveyor,
receiving control information associated with a further one of the plurality of conveyors that is adjacent to the conveyor, the control information being based on further status information concerning the further conveyor and further control information associated with a still further one of the plurality of conveyors that is adjacent to the further conveyor, the control information thereby being based on at least some of still further status information concerning the still further conveyor, and
controlling the conveyor based on the status information concerning the respective conveyor and the received control information.

12. The method of claim 11 further comprising generating, for each of the plurality of conveyors, associated control information that is based on the respective status information concerning that conveyor and its received control information.

13. The method of claim 11 wherein the respective conveyor, the further conveyor and the still further conveyer are part of a chain of conveyors; the control information being further based on at least some of the status information concerning additional ones of the chain of conveyors.

14. The method of claim 11 wherein the control information is based on at least some of the status information concerning each of the chain of conveyors.

15. The method of claim 11 wherein said receiving step includes receiving respective control information associated with each of a plurality of further conveyors that are adjacent to the one conveyor, the control information associated with a particular one of the further conveyors being based on particular further status information concerning the particular further conveyor and particular further control information associated with a particular still further one of the plurality of conveyors that is adjacent to the particular further conveyor, the control information associated with the particular further conveyor being based on at least some of particular still further status information concerning the particular still further conveyor; and said controlling step includes controlling the one conveyor based on the status information concerning that conveyor and the control information associated with each of the further conveyors.

16. The method of claim 15 further comprising generating, for each of the plurality of conveyors, associated control information based on the status information concerning that conveyor and the control information associated with each of its adjacent further conveyors.

* * * * *